United States Patent [19]
Rosansky et al.

[11] 3,892,589
[45] July 1, 1975

[54] SEALED BATTERY CONSTRUCTION

[75] Inventors: Martin G. Rosansky, Monsey; Bruce E. Jagid, Whitestone, both of N.Y.

[73] Assignee: Power Conversion, Inc., Mount Vernon, N.Y.

[22] Filed: Apr. 24, 1973

[21] Appl. No.: 353,961

Related U.S. Application Data

[62] Division of Ser. No. 203,976, Dec. 2, 1971, Pat. No. 3,748,186.

[52] U.S. Cl. ............................................. 136/6 LN
[51] Int. Cl. ......................................... H01m 35/00
[58] Field of Search ..................... 136/6 LN, 83, 100

[56] References Cited
UNITED STATES PATENTS

| | | | |
|---|---|---|---|
| 3,423,242 | 1/1969 | Meyers et al. | 136/6 LN |
| 3,493,433 | 2/1970 | Hoffmann | 136/6 LN |
| 3,567,515 | 3/1971 | Maricle et al. | 136/83 R |
| 3,578,500 | 5/1971 | Maricle et al. | 136/83 R |
| 3,748,186 | 7/1973 | Rosansky et al. | 136/175 |

*Primary Examiner*—John H. Mack
*Assistant Examiner*—C. F. LeFevour
*Attorney, Agent, or Firm*—Hopgood, Calimafde, Kalil, Blaustein & Lieberman

[57] ABSTRACT

Dry air that does not react with other components of a battery is included in a battery casing by assembling the casing in a dry air atmosphere. The casing is partially evacuated, and a liquid electrolyte that expands substantially when heated is introduced. The casing is then sealed in a gas tight manner. The residual dry air is compressed when the temperature rises permitting the electrolyte to expand without leaking from the casing.

1 Claim, 1 Drawing Figure

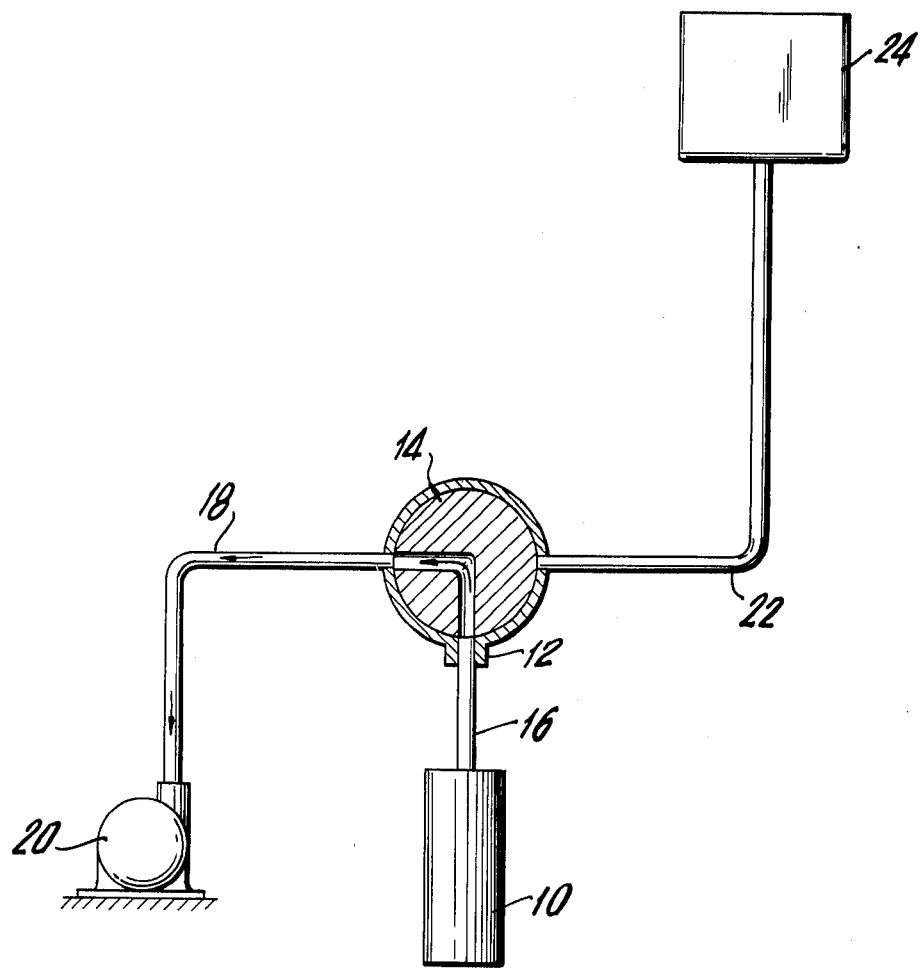

SEALED BATTERY CONSTRUCTION

BACKGROUND OF THE INVENTION:

This is a division of application Ser. No. 203,976 filed Dec. 2, 1971 now U.S. Pat. No. 3,748,186 entitled "Method for Filling Sealed Batteries."

This invention relates to electric current-producing cells, and more particularly to a cell in which a predetermined quantity of a dry air that does not react with other components of the cell is sealed within an airtight casing along with the electrolyte to permit thermal expansion of the electrolyte without leakage.

Current producing cells which use alkali metals or alkaline earth metals, such as lithium, as negative electrodes are known to provide high power and high energy per unit of weight and volume in comparison to the more common types of batteries which use aqueous electrodes. Non-aqueous batteries use liquid electrolytes which, like most liquids, expand substantially when the temperature increases. These electrolytes tend to leak from sealed battery casings. Failures of this type seriously detract from the advantages non-aqueous batteries otherwise possess.

There is presently a need for a simple, inexpensive and efficient method of filling batteries and a resulting battery construction that will prevent leakage of a liquid electrolyte from a sealed battery casing when the temperature rises.

SUMMARY OF THE INVENTION

According to the present invention, dry air is introduced into a cell casing by assembling the casing in a dry air atmosphere. The casing is subsequently partially evacuated to a predetermined residual dry air pressure that corresponds to the desired proportion of dry air in the finished cell, and an anhydrous liquid electrolyte that expands substantially when heated, is introduced into the casing. Then the casing is sealed in an air-tight manner with the dry air and the electrolyte therein. An advantage of this filling technique is that the proportions of dry air and electrolyte can be controlled without measuring the volume of either. If the pressure of the supply of electrolyte is constant, the proportion of dry air and electrolyte is a simple function of the residual dry air pressure. This proportion is completely independent of the total volume of the cell casing to be filled.

The non-aqueous electric current-producing cell which is the product of the above method comprises a sealed battery casing containing a negative electrode, a positive electrode, and a separator for insulating one electrode from the other. An anhydrous liquid electrolyte that expands substantially when heated, and a predetermined quantity of dry air are also contained within the casing, which is sealed in an airtight manner. The liquid electrolyte can expand without escaping from the casing by compressing the dry air.

The electrolyte, like most liquids, expands when heated. One electrolyte for use with the invention comprises $SO_2$ in the form of an anhydrous liquid mixed with a co-solvent of at least one anhydrous liquid organic compound that is inert with respect to the negative electrode. The material of which the negative electrode is made may be selected from the group consisting of alkali metals and alkaline earth metals.

It should be noted that the term "battery" is used herein to refer to any current producing cell. It is not used in the more limited sense, in which it is sometimes employed, to refer only to two or more cells in combination.

BRIEF DESCRIPTION OF THE DRAWINGS

For a more detailed understanding of the invention, reference may be made to the discussion below taken in conjunction with the accompanying drawing which shows, schematically, an arrangement for filling batteries in accordance with the invention.

DESCRIPTION OF THE PREFERRED EMBODIMENT

A non-aqueous electric current-producing cell constructed in accordance with the invention comprises a casing having sealed therein a negative electrode made of a material selected from the group consisting of alkali metals and alkaline earth metals at least equal to or above zinc in the electrochemical series, and a positive electrode. The electrodes are insulated from each other by a separator. The cell further comprises an anhydrous liquid electrolyte comprising a relatively high concentration of anhydrous liquid $SO_2$ mixed with a co-solvent of at least one anhydrous liquid organic compound inert to said negative electrode, said liquid sulfur dioxide constituting a major portion by weight of the liquid electrolyte, for example, preferably 60% and above, with the balance thereof essentially said liquid organic compound and a solute in the form of a salt of said negative electrode metal dissolved in said electrolyte. In order to assure the relatively high concentration of liquid $SO_2$ in the electrolyte, it is maintained at a pressure above atmospheric, e.g., above 25 psi gage, referred to 22°C. This may be accomplished by introducing the liquid $SO_2$ into the battery casing in the referigerated state so that when it is sealed in the cell and heated to ambient temperature, e.g., 22°C, it will be under pressure sufficient to maintain the liquid state. Alternatively, it may be added to the cell at ambient temperature under pressure to maintain the liquid state.

A battery is filled using the above-described electrolyte in a manner which is best understood with reference to the drawing which shows a battery casing 10 that encloses two electrodes and a separator (not shown). The casing 10 at first contains air from the ambient atmosphere. This air has a natural water vapor content that cannot be tolerated in a non-aqueous battery. Therefore, the ambient air is replaced with dry air as the first step in the filling method. Because non-aqueous batteries are conventionally assembled in dry boxes or dry rooms, the removal of the ambient air and its subsequent replacement with dry air can be accomplished as an integral part of the process of inserting the electrodes and insulator into the battery casing. For instance, the casing may be placed in an antechamber of the dry box and evacuated. Then the antechamber is backfilled from the main enclosure of the dry box, and dry air is thus introduced into the casing to replace the ambient air which has been removed.

Next, the casing 10 is connected to a fitting 12 that is attached to a valve 14. Connection to the fitting 12 is facilitated by an eyelet 16 that forms part of the top of the casing 10 and extends upwardly therefrom. The valve 14 is at this time positioned to provide communication between the casing 10 and a line 18 which leads to a vacume pump 20. The casing 10 is thus evacuated to a predetermined residual dry air pressure. When this predetermined residual pressure is reached, the position of the valve 14 is changed to provide communication between the casing 10 and a line 22 which leads to an electrolyte reservoir 24. At the same time, the casing 10 is disconnected from the line 18.

Because the pressure in the reservoir 24 is higher than the residual pressure in the casing 10, the nonaqueous electrolyte flows into the casing 10 until the pressure therein is equal to the pressure in the reservoir. The valve 14 is then turned to a closed position. The casing 10 is sealed in an air tight manner by pinching and cold welding the stem of the eyelet 16.

The battery made in this way includes a predetermined quantity of residual dry air enclosed in a sealed casing along with the electrolyte. This residual air compresses and expands to permit thermal expansion and contraction of the electrolyte as the temperature changes. In this way, leakage of the electrolyte from the sealed casing is prevented.

The above-described method of filling batteries is readily automatized. A pressure sensitive device that is responsive to the pressure differential between the top of the electrolyte and the interior of the casing 10 can be used to actuate a solenoid that changes the position of the valve 14 when a residual pressure is reached that corresponds to the desired proportion of dry air in the finished cell. This arrangement will provide the same proportion of dry air to electrolyte regardless of the volume of the casing 10. Thus, various size casings may be filled without adjusting the sensing mechanism. Moreover, significant efficiencies result from the use of pressure sensitive devices instead of volumetric measurements.

Air is used as the gas introducted into the casing to displace the ambient air containing water vapor because it is readily available, inexpensive, easily stored, and does not react with other components of the cell.

The invention could be practiced using a variety of nonaqueous electrochemical systems that include a liquid that expands as the temperature increases. A relatively small number are described here by way of example. The term liquid, as used here, encompasses all consistencies sufficiently non-viscous to flow and adapt to the contours of the space available within the casing. Only solids and very thick pastes that naturally leave sufficient unused volume to permit thermal expansion are excluded.

The quantity of liquid $SO_2$ in the electrolyte solution may range from about 60 to 90% by weight, preferably from about 65 to 85% by weight.

Lithium is preferred for the negative electrode and may constitute the entire anode structure, or it may be pressed onto a screen of conductive but inert metal, such as nickel, copper, silver, iron, or the like which serves as the anode conductor.

The choice of material that is to be used as the anode will depend on the characteristics desired in the cell. In the case where high voltage is required, a metal which is highly active, such as lithium, calcium, and other alkali and alkaline earth metals would be selected for the anode metal. If a lower voltage is desired, then the less active alkaline earth metals, such as magnesium and zinc, may be employed as the anode material.

Liquid $SO_2$ is an essential component of the liquid electrolyte, the $SO_2$ being mixed with a co-solvent of at least one anhydrous liquid organic compound inert with respect to the negative electrode. Examples of organic compounds are aliphatic and aromatic nitriles, such as acetonitrile and benzonitrile; dimethyl sulfoxide; aliphatic amides, such as dimethylacetamide and N,N dimethylformamide; pentacyclic esters, such as propane diol,-1-2carbonate, ethylene carbonate and propylene carbonate; lactones, such as $\gamma$-valerolactone and $\gamma$ butyrolactone; N-methyl 1-2-pyrolidone; aliphatic and aromatic primary, secondary and tertiary amines, e.g., ethylene diamine, isopropylamine, pyridine, etc.; aliphatic and cyclic ethers; high molecular weight water insoluble secondary amine halides; aliphatic and aromatic esters, such as methyl formate, methyl acetate, ethyl formate, ethyl acetate, phenyl acetate, phenyl formate, methyl benzoate, and the like.

The organic co-solvent making up the balance of the liquid electrolyte may comprise a blend of organic compounds. A particularly useful blend is a mixture of methyl formate and propylene carbonate or ethylene carbonate. The blend may comprise 80 to 60% by volume of methyl formate to 20 to 40% by volume of propylene carbonate or ethylene carbonate.

Each of the compounds methyl formate, methyl acetate, ethyl formate, and ethyl acetate is also particularly useful alone or as a blend with propylene carbonate or ethylene carbonate. The blends may range similarly as above, that is, 80 to 60% by volume of each of methyl formate, methyl acetate, ethyl formate, and ethyl acetate to 20 to 40% by volume with either propylene carbonate or ethylene carbonate.

The salts used as the solute in the above-mentioned solvents and which function as the ion carrier in the electrolyte solution are generally the soluble salts of the alkali or alkaline metals. Generally, the metallic ion of the salt employed at the cathode will be of the same metal as the anode in a given cell. The anodic portion of the salt can be a chlorate, perchlorate, thiocynate cyanide, rhodanide, iodide, fluoride, chloride, bromide, sulfide, sulfate, picrate, fluoborate, hydride and borohydride of the electrode metal.

The cathode is, of course, the site of the cathodic reactions and the substances and structure entering into the cathodic reaction are known as the cathode. Hence, the cathode of a cell will comprise a current conductor for conducting electrons into the cell and any other material in contact with the conductor employed to prevent cathode accumulations which would decrease the operational capabilities of the cell. Cathodes of non-aqueous cells conventionally utilize a depolarizer, that is, it will be a conductor of such structure as to prevent physically or chemically the accumulation of polarizing products at the cathode. The injection of electro-positive metal ions into the electrolyte solution from the anode during cell discharge must be complemented with a withdrawal of positive ions or an introduction of negative ions at the cathode, or else partial loss of contact between the electrolyte and the cathode conductor may occur.

This phenomenon of the formation of reaction products at the cathode that tends to increase the cathode potential and/or cause loss of contact between the electrolyte solution and the cathode conductor is known as polarization. Depolarization can be accomplished by chemical or physical means, the former being the preferred method. Chemical depolarization is effected by including a material in contact with the cathode conductor, which will react with any formed polarizing products and thus prevent their accumulation. Depolarization takes place by reduction of the depolarizing material at the cathode, and any reducible metal or non-metal substance in contact with the cathode conductor is suitable for this purpose.

The cathodes described here are usually prepared from electrically conductive non-metals and metals (e.g., powders) inert to the electrolyte, such as carbon, boron, platinum, zirconium, tantalum or the like. Carbon is the preferred material. The term "carbon" as used here includes graphite and other forms of carbon.

The electrochemical system described above does not require the cathode to act as the depolarizer. The passive cathode employed is porous, conductive and inert to the electrolyte with which it is in contact. The cathode consists of finely divided conductive metallic and/or non-metallic materials, such as carbon, nickel, aluminum, silver, copper, platinum or any other electrically conductive material inert to the electrolytic solution mixed with materials like paper fibers, asbestos fibers, finely divided plastic powders, or any other binder to produce a conductive, porous material which is in contact with the metallic grid which is used as the cathode conductor. The preferred cathode in this invention is conductive carbon which is mixed with glass or asbestos fibers and fluorocarbon resin binders (e.g., polytetrafluoroethylene) in contact with a metal grid. Another fluorocarbon resin which may be employed is chlorotrifluoroethylene.

The negative and positive electrodes are insulated from each other by a separator which should, in addition to providing inter-electrode insulation, permit adequate access of the electrolyte to the electrode faces and enable ionic transport within the cell. Materials that are suitable are restricted by the active solvent characteristics of the electrolyte in that the separator should not dissolve in the electrolyte. The following have been found adequate for this purpose: fibrous synthetic materials, such as a copolymer of vinyl chloride and acrylonitrile, polyamide polymers, copolymers of polyvinyl alcohol and polyvinyl chloride, polyacrylate esters, and the like. The thickness of the separator is not particularly critical and should preferably be as thin as possible in order to improve the energy to density ratio of the total cell as well as to minimize the internal resistance of the cell. The membranes are preferably from about 0.5 to 10 mils in thickness (about 0.0005 to 0.010 inch).

The following examples of non-aqueous battery compositions are but several of many that could be employed in accordance with the invention.

EXAMPLE I

In this example, the negative electrode is lithium metal pressed into a fine copper screen (anecter) which is separated from the cathode by a separator of porous polyethylene. The cathode is a passive electrode formed of conductive carbon mixed with glass fibers and polytetrafluoroethylene which acts as a binder, the mixture being then pressed into a fine aluminum screen which acts as a cathecter. Lead wires are connected to the anecter and cathecter for collecting the current when the cell is in operation.

The preferred anhydrous liquid electrolyte comprises about 80% by weight of the solvent liquid sulfur dioxide and about 20% by weight of a co-solvent of the anhydrous organic liquid methyl formate. Dissolved in the liquid electrolyte is approximately one mole of lithium bromide.

Before filling the cell in the manner described above, a predetermined amount of methyl formate is mixed with the lithium bromide, which, in turn, is mixed with liquid $SO_2$ under conditions (above atmospheric referred to 22°C) to maintain the solution in the liquid state. This solution forms the electrolyte to the introduced into a partially evacuated cell.

During cell discharge, the electrolyte salt is not consumed and merely acts as an ion carrier maintaining essentially a constant electrolyte solution conductivity. The cell is therefore capable of producing a constant current for prolonged periods of time at extremely flat voltage levels. This system is capable of storage for long periids of time, provided leakage does not occur, because it uses a passive cathode and the electrolyte combines with the lithium forming a monomolecular oxide layer on the anode surface which prevents cell self discharge. Since the non-aqueous inorganic liquid solvents and organic co-solvents used in this invention have a broad range of freezing and boiling points, operation over a wide range of temperatures (−55°C to greater than 70°C) is possible.

A cell such as that described provides energy densities in excess of 150 watt-hours/lb. at potentials greater than 2.0 volts. The cells described were found to have an internal resistance of less than about 150 milliohms.

The overall equilibrium reaction of this system consists of the anode metal combining with the sulfur dioxide to form a compound which precipitates at the porous inert cathode. The electrochemical reaction is reversible which allows the battery to be recharged.

EXAMPLE II

In this example, the negative electrode is lithium metal pressed onto a copper screen. The cathode is a passive electrode formed of conductive carbon mixed with asbestos and polytetrafluoroethylene to provide porosity and to act as a binder. The mixture is then pressed onto an aluminum screen which acts as the conductor. Lead wires are connected to the conductor for collecting current when the cell is in operation.

The anhydrous liquid electrolyte comprises about 60% by weight of liquid sulfur dioxide and 40% by weight of a co-solvent of an anhydrous organic liquid of methyl formate and propylene carbonate at a volume ratio of 50% methyl formate and 50% propylene carbonate. Dissolved in the liquid electrolyte is the equivalent amount of lithium chloride corresponding to a saturated solution thereof.

Other electrochemical systems which may be employed in carrying out the invention are given in the following example:

EXAMPLE III

| System A | |
|---|---|
| Negative electrode | K |
| Inorganic compound | 60% $SO_2$ |
| Organic compound | 40% dimethylsulfoxide |
| Solute | 0.5M KBr |
| Positive passive electrode | carbon mixed with asbestos fibers and pressed on a nickel screen |
| System B | |
| Negative electrode | Ca |
| Inorganic compound | 80% $SO_2$ |
| Organic compound | 20% (ethyl formate - propylene carbonate) |
| Solute | $Ca(ClO_3)_2$ |

EXAMPLE III-Continued

| | |
|---|---|
| Positive passive electrode | copper powder mixed with paper fibers and pressed on silver mesh screen |
| System C | |
| Negative electrode | Ba |
| Inorganic compound | 70% $SO_2$ |
| Organic compound | 30% isopropylamine |
| Solute | 0.75 M $BaBr_2$ |
| Positive passive electrode | same as System A |
| System D | |
| Negative electrode | Li |
| Inorganic compound | 85% $SO_2$ |
| Organic compound | 15% ethylene diamine |
| Solute | 0.5M LiF |
| Positive passive electrode | aluminum powder mixed with asbestos fibers and polytetrafluoroethylene as a binder pressed onto an aluminum grid |
| System E | |
| Negative electrode | Na |
| Inorganic compound | 65% $SO_2$ |
| Organic compound | 35% methyl acetate |
| Solute | NaBr |
| Positive electrode | Same as System D |

In accordance with this invention, a non-aqueous battery can be constructed by a simple, fast, and inexpensive method. The battery retains the advantages associated with non-aqueous construction, but the problem of leakage associated with temperature changes is solved.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

We claim:

1. A non-aqueous electric current-producing cell comprising a sealed battery casing containing a negative electrode made from a material selected from the group consisting of alkali metals and alkaline earth metals, a positive electrode, a separator for insulating the electrodes from each other, a liquid electrolyte that expands substantially when heated, including $SO_2$ in the form of an anhydrous liquid mixed with a cosolvent of at least one anhydrous liquid organic compound that is inert with respect to the negative electrode, and a predetermined quantity of dry air that does not react with other components of the cell whereby the liquid electrolyte is permitted to expand without escaping from the sealed casing by compressing the dry air.

* * * * *